United States Patent [19]
Moriset

[11] Patent Number: 5,308,113
[45] Date of Patent: May 3, 1994

[54] AIRBAG INFLATION-CONTROLLING MEMBER
[75] Inventor: Michael A. Moriset, Troy, Mich.
[73] Assignee: TRW Vehicle Safety Systems Inc., Lyndhurst, Ohio
[21] Appl. No.: 959,291
[22] Filed: Oct. 9, 1992
[51] Int. Cl.$^5$ ............................................... B60R 21/20
[52] U.S. Cl. ................................................. 280/743 A
[58] Field of Search ............... 280/728 R, 730 R, 733, 280/743 A, 728 A

[56] References Cited
U.S. PATENT DOCUMENTS

| | | | |
|---|---|---|---|
| 3,879,056 | 4/1975 | Kawashima et al. | 280/743 |
| 3,879,057 | 4/1975 | Kawashima et al. | 280/739 |
| 4,966,389 | 10/1990 | Takada | 280/743 |
| 5,094,477 | 3/1992 | Togawa | 280/743 |

FOREIGN PATENT DOCUMENTS 4-283145  10/1992  Japan ................................ 280/728

Primary Examiner—Brian L. Johnson
Assistant Examiner—Paul Dickson
Attorney, Agent, or Firm—Calfee Halter & Griswold

[57] ABSTRACT

A vehicle airbag (12) includes an inflatable bag (20) and an inflation-controlling member (40) which is coupled to the bag (20). The inflation-controlling member (40) includes a releasable connection (42) and a stretchable section (44). The releasable connection (42) remains intact during initial stages of the inflation process so that the inflation-controlling member (40) extends to an initial length $L_{initial}$ and the bag (20) assumes an initial shape. The releasable connection (42) releases during intermediate stages of the inflation process so that the inflation-controlling member (40) extends to an intermediate length $L_{intermediate}$ and the bag (20) assumes an initial shape. The stretchable section (44) stretches during the final stages of the inflation process so that the inflation-controlling member (40) extends to a final length $L_{final}$ and the bag (20) assumes a final shape.

51 Claims, 6 Drawing Sheets

AIRBAG INFLATION-CONTROLLING MEMBER

FIELD OF THE INVENTION

This invention relates generally, as indicated, to an airbag inflation-controlling member. More particularly, the present invention relates to an inflation-controlling member that, when incorporated into an airbag, allows for a three-stage inflation process in which an out-of-position occupant will be protected and an in-position occupant's contact with the bag will be of a relatively gentle nature.

BACKGROUND AND SUMMARY OF THE INVENTION

An airbag assembly is commonly installed in a vehicle to protect an occupant in the event of a crash or collision. A typical airbag assembly comprises a reaction device, an airbag coupled to the reaction device, and an inflator also coupled to the reaction device. The reaction device is coupled to a structural component of the vehicle. For example, in a passenger-side airbag assembly, the airbag assembly will commonly be incorporated into the dashboard or instrument panel of the vehicle.

The airbag will almost always include a bag which is made of a flexible fabric, such as nylon, and which is designed to be fully inflated to a desired geometry. For example, in a passenger-side airbag assembly, the bag will usually be adapted to inflate to a roughly cylindrical or pillow-like shape. The bag will include portions defining a chamber and a mouth portion defining an inflation fluid inlet which communicates with the chamber.

At the onset of a crash or collision, the inflator supplies inflation fluid to the bag to inflate the airbag towards the occupant. More particularly, the inflation fluid flows through the bag inlet and into the chamber to inflate the airbag. During the inflation process, the kinetic energy of the inflation fluid imposes forces upon the airbag. The airbag is subjected to initial forces during initial stages of the inflation process, intermediate forces during intermediate stages of the inflation process, and final forces during final stages of the inflation process.

An airbag is generally designed so that when it is fully inflated to a final shape, a front or "occupant-contacting" portion of the airbag will contact an occupant situated in the expected position in the associated vehicle seat. In this manner, the in-position occupant is cushioned against impact with a structural part of the vehicle. For a passenger-side airbag, an in-position occupant is situated adjacent the side of the vehicle opposite the steering wheel and his/her torso is located adjacent the back of the passenger seat.

As the occupant contacts the airbag, he/she will be subjected to any forces created during the inflation process which are not absorbed by the airbag. Thus, if an airbag does not adequately absorb such forces, the occupant may be subjected to them. Accordingly, one of applicant's airbag design concerns is the dissipation of these forces prior to the airbag contacting the occupant so that his/her contact will be of a relatively gentle nature.

Another of applicant's airbag design concerns is the protection of an out-of-position occupant. As was indicated above, an airbag is generally designed so that its occupant-contacting portion will contact an occupant situated in the expected position. However, in some instances, an occupant may not be positioned in this manner and may instead be situated towards the center of the seat and closer to the instrument panel.

The present invention provides an airbag inflation-controlling member which controls the shape of an inflatable bag and absorbs forces imposed on the bag during the inflation process. Specifically, the inflation-controlling member causes the bag to assume a shape compatible with protecting an out-of-position occupant during the initial stages of the inflation process. Additionally, the inflation-controlling member dissipates kinetic energy prior to the bag contacting an in-position occupant so that such contact will be of a relatively gentle nature.

More particularly, the present invention provides a vehicle airbag comprising an inflatable bag and an inflation-controlling member which is coupled to the bag. The inflation-controlling member extends through the chamber of the bag during the inflation process and controls the shape of the bag. The inflation-controlling member includes a releasable connection and a stretchable section. The releasable connection remains intact during the initial stages of the inflation process so that the inflation-controlling member extends to an initial length and the bag assumes an initial shape. The releasable connection releases during intermediate stages of the inflation process so that the inflation-controlling member extends to an intermediate length and the bag assumes an intermediate shape. The stretchable section stretches during the final stages of the inflation process so that the inflation-controlling member extends to a final length and the bag assumes a final shape. The initial shape of the bag is designed to protect an out-of-position occupant and the final shape of the bag is designed to protect an in-position occupant.

Preferably, the inflation-controlling member comprises a tether having a first end attached to the bag and a second end also attached to the bag. The releasable connection and the stretchable section are positioned on the tether intermediate the first and second ends. The first end of the tether is attached to the mouth portion of the bag and the second end of the tether is attached to the occupant-contacting portion of the bag.

More preferably, the inflation-controlling member is a three-piece tether comprising a first end piece, a second end piece, and a central piece joining the first end piece to the second end piece. The first and second end pieces include the first and second ends of the tether, respectively. The releasable connection joins intermediate portions of the first and second end pieces together and the central piece comprises the stretchable section of the inflation-controlling member. The releasable connection may be formed with break-away stitching. The stretchable section may be made of a material having a 45° weave pattern.

Thus, the present invention provides a tether-like member for controlling the shape of an inflatable bag and absorbing forces imposed on the bag during an inflation process. When incorporated into an airbag, the tether-like member allows for a three-stage inflation process in which an out-of-position occupant will be protected and an in-position occupant's contact with the bag will be of a relatively gentle nature.

In the past, airbags have been developed which incorporate tether-like members having either a releasable connection or a stretchable section. For example, U.S.

Pat. No. 3,879,056 to Kawashima et al. discloses an airbag including a member which is secured to side portions of the bag. The member includes a central folded part having a releasable connection formed by break-away stitching. The releasable connection is designed so that when an occupant contacts the bag, the stitching is broken, the central folded part is released, and the member expands from a first length to a second length. In this manner, the rebounding force of the airbag is absorbed or dissipated.

Additionally, U.S. Pat. No. 4,966,389 to Takada discloses an airbag in which four tether-like members extend between, and are connected to, the mouth portion of the bag and the occupant-contacting portion of the bag. The members are connected to the mouth portion of the bag by a fastener which includes resilient portions composed of 45° bias material. During the latter stages of the inflation process, the members abruptly arrest the movement of the occupant-contacting portion of the bag thereby imposing significant high tensile forces on the members. The resilient portions of the fastener absorb the high tensile forces to prevent separation of the members from the mouth of the bag.

Thus, the prior art discloses tether-like members having either a releasable connection or a stretchable section. However, the prior art members are not believed to allow for a three-stage inflation process in which an out-of-position occupant will be protected and an in-position occupant's contact with the bag will be of a relatively gentle nature. Applicant therefore believes that a need remains, and that present invention satisfies such a need, for an inflation-controlling member which accommodates design criteria associated with both out-of-position and in-position occupants.

DETAILED DESCRIPTION

Figure 1:
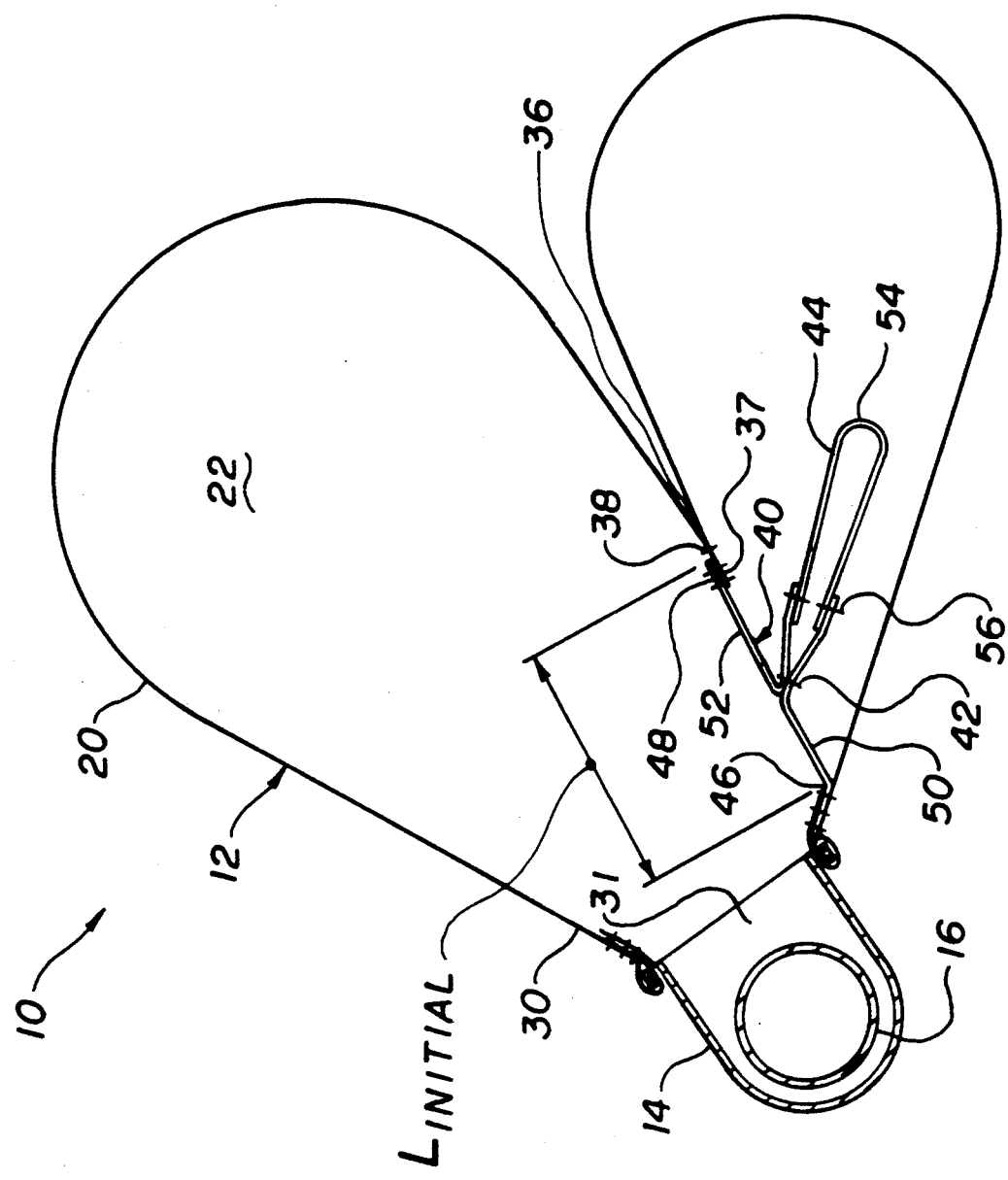
FIG. 1 is a schematic side view of an airbag assembly which includes an airbag incorporating an inflation-controlling member according to the present invention, the member being shown extended to an initial length and the bag of the airbag being shown assuming an initial shape.
Figure 2:
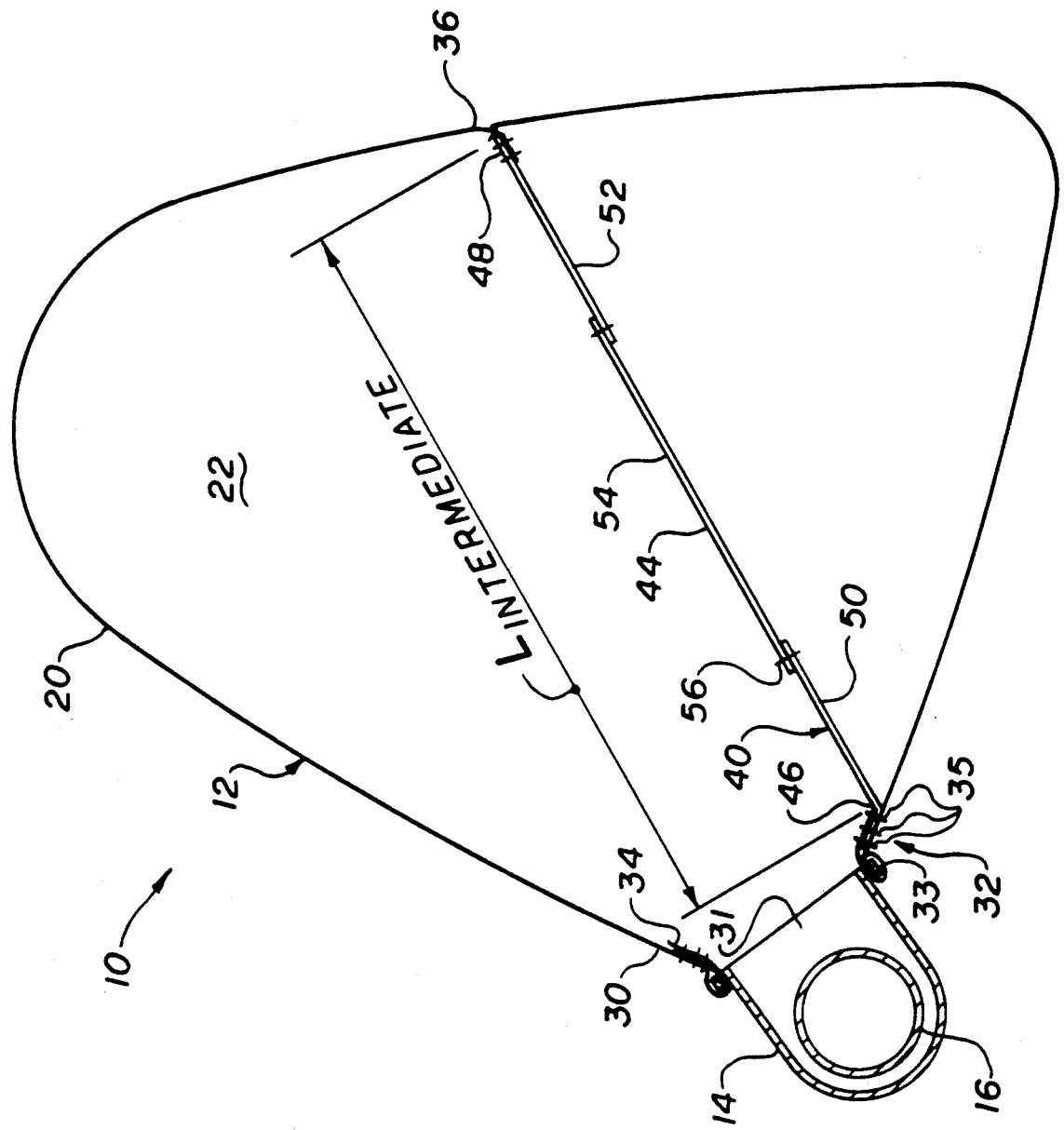
FIG. 2 is a schematic view of the airbag assembly of FIG. 1, the inflation-controlling member being shown extended to an intermediate length and the bag being shown assuming an intermediate shape.
Figure 3:
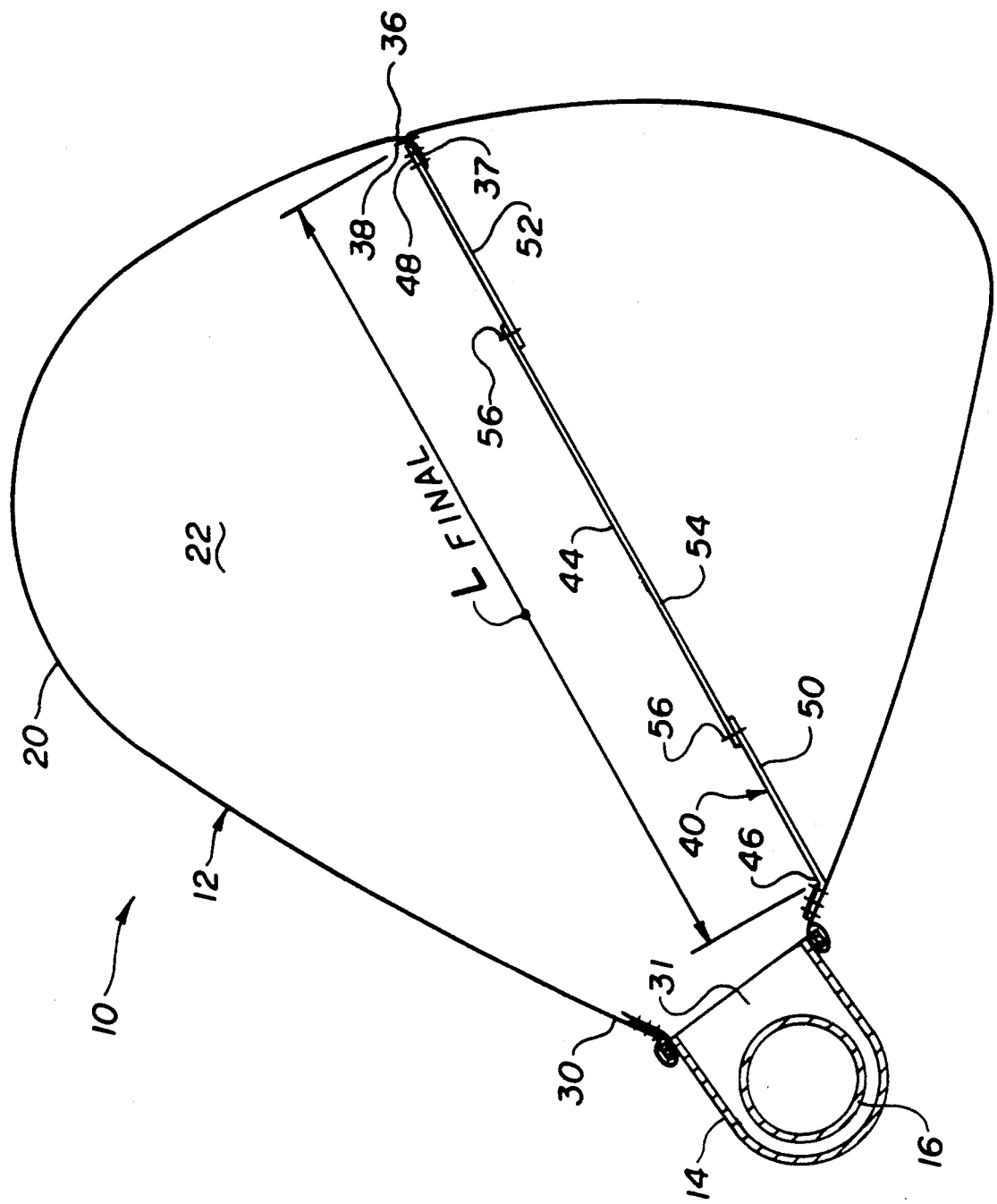
FIG. 3 is a schematic view of the airbag assembly of FIGS. 1 and 2, the inflation-controlling member being shown extended to a final length and the bag being shown assuming a final shape.

Referring now to the drawings in detail, and initially to FIG. 1-3, an airbag assembly 10 is schematically shown which incorporates an airbag 12 according to the present invention. The airbag assembly 10 further comprises a reaction device 14 and an inflator 16. Although not specifically shown in the drawings, the airbag 12 and the inflator 16 are coupled to the reaction device 14 in a suitable manner. The reaction device 14 is adapted to be coupled to a structural part of a vehicle. The illustrated airbag assembly 10 is a passenger-side airbag assembly and is designed to be incorporated into the dashboard or instrument panel of a vehicle.

The airbag 10 comprises a bag 20 which is made of a flexible fabric, such as nylon. In the illustrated passenger-side airbag assembly 10, the bag 20 is adapted to be fully inflated to a roughly cylindrical or pillow-like shape. (See FIG. 3.) The bag 20 includes portions defining a chamber 22 and a mouth portion 30 defining an inflation fluid inlet 31 which communicates with the chamber 22.

At the onset of a crash or collision, the inflator 16 supplies inflation fluid to the airbag 12. More particularly, the inflation fluid flows through the bag inlet 31 and into the chamber 22 to inflate the bag 20. During the inflation process, the kinetic energy of the inflation fluid imposes forces upon the bag 20. The bag 20 is subjected to initial forces during the initial stages of the inflation process (see FIG. 1), intermediate forces during the intermediate stages of the inflation process (see FIG. 2), and final forces during the final stages of the inflation process (see FIG. 3).

Figure 4:
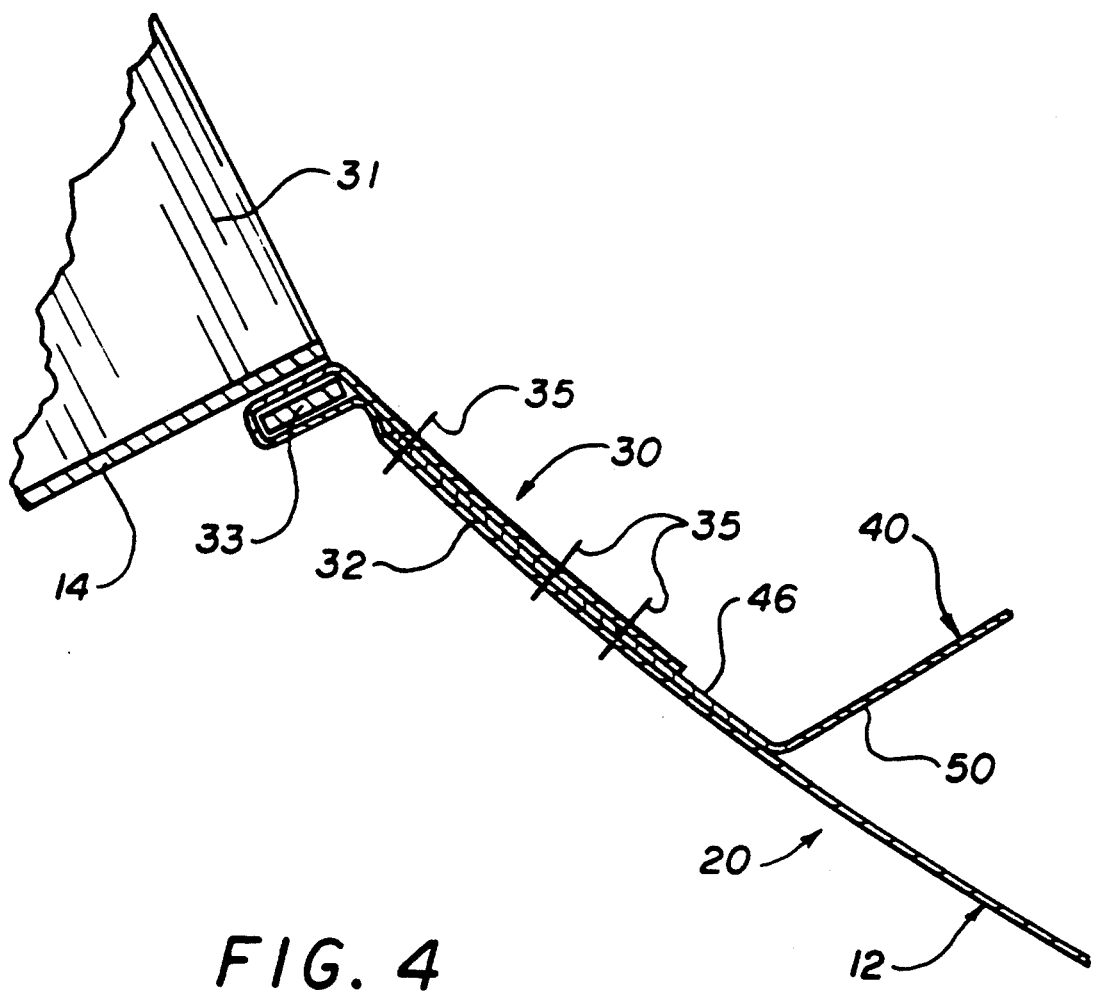
FIG. 4 is an enlarged side sectional view of the attachment of a first end of the inflation-controlling member to the bag of the airbag.

In the illustrated embodiment, the mouth portion 30 comprises a hem 32 which defines a channel for a retainer 33. (See FIG. 4.) Although not specifically shown in the drawings, the retainer 33 may be used to secure the airbag 12 to the reaction device 14. The mouth portion 30 additionally includes a heat shield 34 which surrounds a top region of the inflation fluid inlet 31 and which shields the chamber-defining portions of the bag 20 from heat transferred by the inflator 16. A series of stitch lines 35 pass through the two layers of the hem 32 to capture the retainer 33 within the hem 32. The top stitch lines 35 also pass through the heat shield 34 to secure the heat shield to top regions of the hem 32. The stitch lines 35 are designed to withstand any forces exerted during the inflation process.

Figure 5:
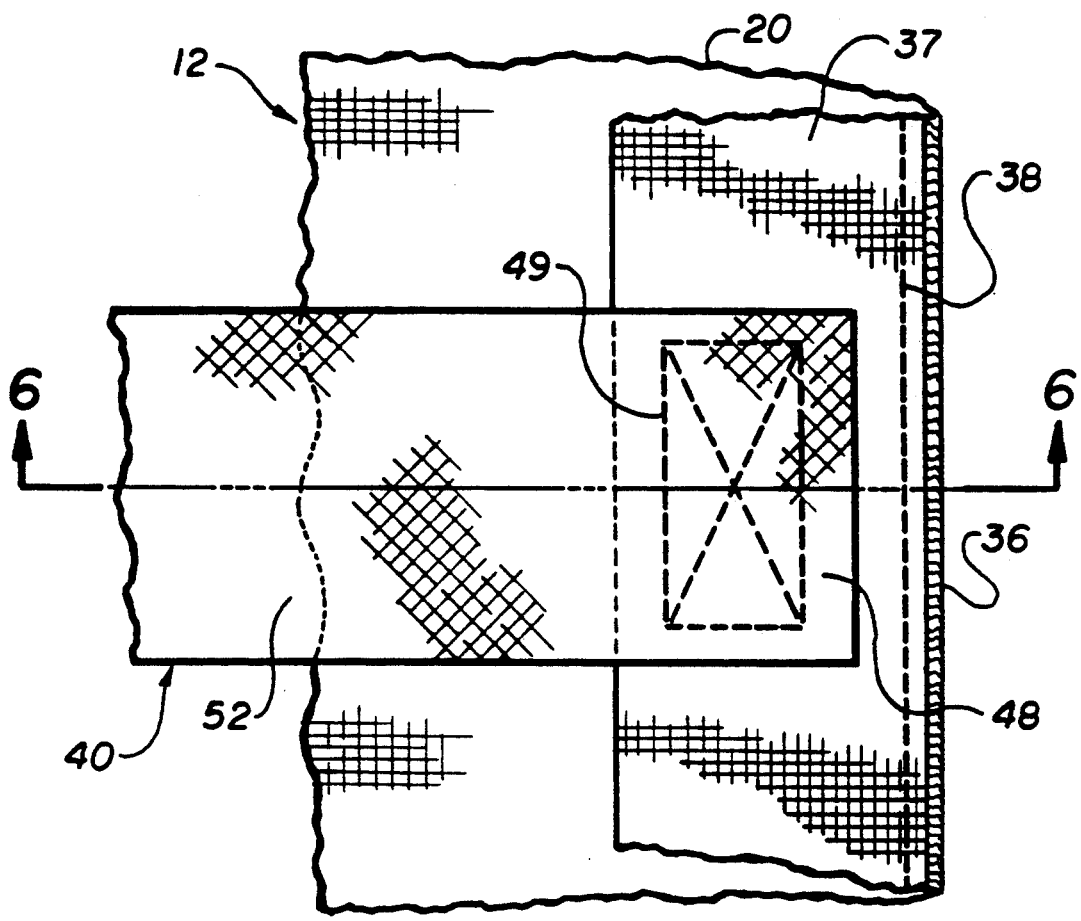
FIG. 5 is an enlarged top view of the attachment of a second end of the inflation-controlling member to the bag of the airbag.
Figure 6:
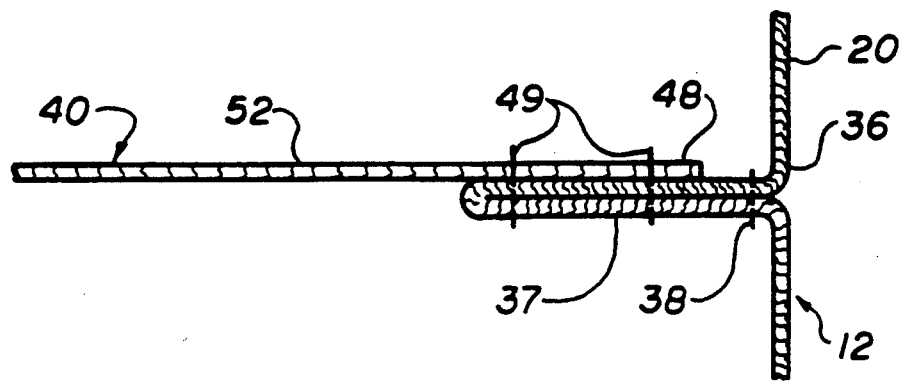
FIG. 6 is an enlarged side sectional view of the attachment of FIG. 5.

The airbag 12 is designed so that when the bag 20 is fully inflated, an "occupant-contacting" portion 36 of the airbag will contact an occupant situated in the expected position, or an in-position occupant. The occupant-contacting portion 36 (which is one of the chamber-defining portions of the bag 20) is located on a front region of the bag 20) approximately opposite of the fluid inlet 31. An internal fold 37, approximately 45–55 millimeters wide, is formed in a central region of the occupant-contacting portion 36 and projects into the chamber 22. (See FIGS. 5 and 6.) The internal fold 37 is held intact by a stitch line 38 which is designed to withstand any forces exerted during the inflation process.

The airbag 12 further comprises an inflation-controlling member 40 which is coupled to the bag 20 and which extends through the chamber 22. The member 40 controls the shape of the bag 20 and absorbs forces imposed on the bag 20 during the inflation process. More particularly, the inflation-controlling member 40 causes the bag 20 to assume a shape compatible with protecting an out-of-position occupant during the initial stages of the inflation process. Additionally, the inflation-controlling member 40 dissipates kinetic energy prior to the bag 20 contacting an in-position occupant so that such contact will be of a relatively gentle nature.

The inflation-controlling member 40 includes a releasable connection 42 and a stretchable section 44. The releasable connection 42 remains intact during the initial stages of the inflation process so that the inflation-controlling member 40 extends to an initial length $L_{initial}$ and the bag 20 assumes an initial shape. (See FIG. 1.) The releasable connection 42 releases during intermediate stages of the inflation process so that the inflation-controlling member 40 extends from the initial length $L_{initial}$ to an intermediate length $L_{intermediate}$ and the bag 20 assumes an intermediate shape. (See FIG. 2.) The stretchable section stretches during the final stages of the inflation process so that the inflation-controlling member 40 extends from the intermediate length $L_{intermediate}$ to a final length $L_{final}$ and the bag assumes a final shape. (See FIG. 3.)

The airbag 12 is designed so that when the inflation-controlling member 40 reaches the initial length $L_{initial}$, and the bag 20 assumes its initial shape, the airbag 12 will protect an out-of-position occupant. As is best seen by referring to FIG. the initial shape of the illustrated bag 20 is a "double-hump" shape. The inflation-controlling member 40 limits the outward movement of the occupant-contacting portion 36 of the bag 20 so that the bag takes on this initial "squashed" shape, when viewed from the side.

The airbag 12 is also designed so that when the inflation-controlling member 40 is extended to the intermediate length $L_{intermediate}$, and the bag 20 assumes its intermediate shape, the bag 20 is approaching, but has not reached, the fully inflated cylindrical or pillow-like shape of the bag 20. When the stretchable section 44 is stretched, and the inflation-controlling member 40 is extended to the final length $L_{final}$, the bag 20 is fully inflated to its final shape. In this final shape, the airbag 12 is designed to protect an in-position occupant. The stretching of the section 44 (which causes the inflation-controlling member 40 to extend from the intermediate length $L_{intermediate}$ to a final length $L_{final}$) dissipates kinetic energy created during the inflation process. In this manner, an in-position occupant's contact with the bag 20 is of a relatively gentle nature.

In the preferred embodiment, the initial length $L_{initial}$ is approximately 96 millimeters, the intermediate length $L_{intermediate}$ is approximately 488 millimeters, and the final length $L_{final}$ is approximately 614-664 millimeters. Thus, the intermediate length $L_{intermediate}$ is at least three times, and preferably approximately five times, as great as the initial length $L_{initial}$. Additionally, the final length $L_{final}$ is at least ten percent longer, and preferably twenty-five to thirty-six percent longer, than the intermediate length $L_{intermediate}$.

As is explained in more detail below, the releasable connection 42 is of a strength which withstands the initial forces but is overcome by the intermediate forces. In this manner, the releasable connection 42 remains intact during the initial stages of the inflation process, thereby allowing the inflation-controlling member 40 to extend to the initial length $L_{initial}$ and the bag 20 to assume the initial shape and further, in this manner, the releasable connection 42 releases during the intermediate stages of the inflation process, thereby allowing the inflation-controlling member 40 to extend to the intermediate length $L_{intermediate}$ and the bag 20 to assume the intermediate shape.

As is also explained in more detail below, the stretchable section 44 is not affected, or stretched, during the initial or intermediate stages of the inflation process. Additionally, the elongation properties of the stretchable section 44 are such that the section will be elongated by the final forces. Thus, the stretchable section 44 is elongated only during the final stages of the inflation process, thereby allowing the inflation-controlling member 40 to extend from the intermediate length $L_{intermediate}$ to the final length $L_{final}$.

The inflation-controlling member 40 extends between, and is connected to, the mouth portion 30 and the occupant-contacting portion 36 of the bag 20. More particularly (see FIG. 4), a first end 46 of the inflation-controlling member 40 is sandwiched between the two layers of the bag hem 32 and is secured to the hem 32 by the stitch lines 35. Additionally (see FIGS. 5 and 6), a second end 48 of the inflation-controlling member 40 is attached to the internal fold 37 of the occupant-contacting portion 36 by a "BOX-X" stitch pattern 49. The stitch pattern 49 is also designed to withstand any forces exerted on it during the inflation process.

Figure 7:
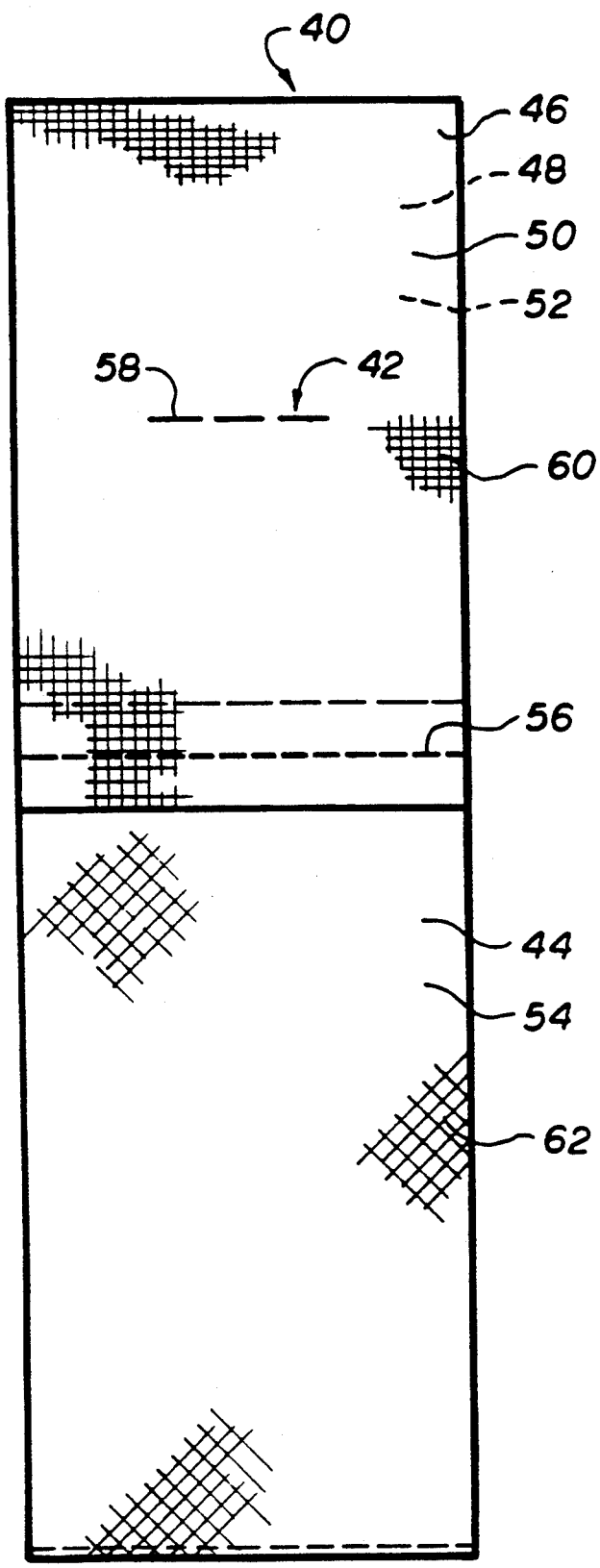
FIG. 7 is an enlarged front view of the inflation-controlling member.
Figure 8:
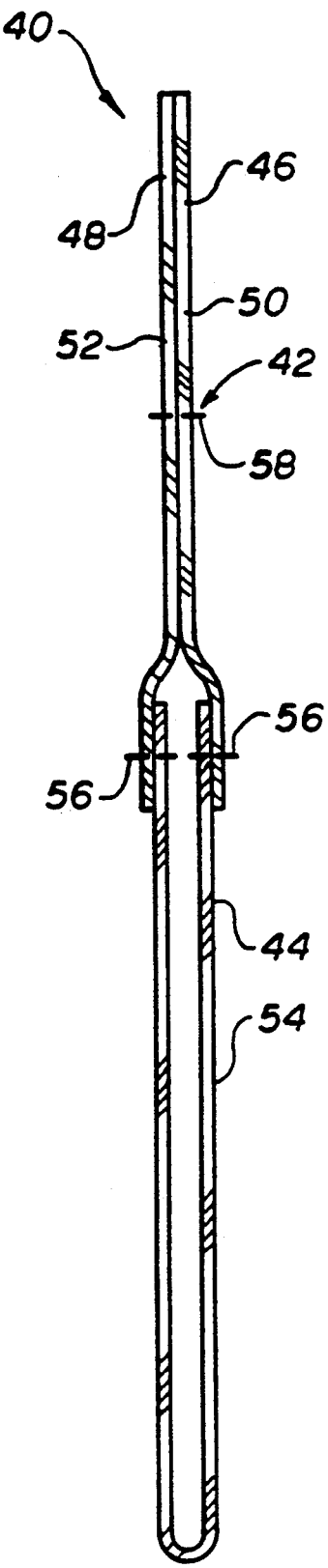
FIG. 8 is an enlarged side sectional view of the inflation-controlling member.

The inflation-controlling member 40 is preferably a three-piece tether comprising a first end piece 50, a second end piece 52, and a central piece 54. (See FIGS. 7 and 8.) The tether pieces 50, 52, and 54 are each rectangular in shape. The end pieces 50 and 52 are essentially identical and approximately 118 millimeters long and approximately 76 millimeters wide. The central piece 54 is approximately 144 millimeters long and approximately 76 millimeters wide. One end of the piece 50 forms the first end 46 of the inflation-controlling member 40. Likewise, one end of the piece 52 forms the second end 48 of the inflation-controlling member 40. Thus, the end pieces 50 and 52 are attached to the bag 20. The opposite ends of the pieces 50 and 52 are attached to the central piece 54 by stitching lines 56. (See FIGS. 7 and 8.) The stitching lines 56 extend through overlapping regions (approximately 18 millimeters long) of the tether pieces. The stitching lines 56 are designed so that the attachment will not be destroyed during the inflation process.

The releasable connection 42 joins intermediate portions of the tether end pieces 50 and 52 together. The releasable connection comprises a "break-away" stitch line 58. Although not specifically shown in the drawings, the stitch line 58 comprises twenty stitches formed from 69 nylon thread and has an approximately 10 stitch/inch density. The span of the stitch line 58 is approximately ⅔ the width of the tether pieces and is centrally located relative to the lateral edges of the pieces. Additionally, the stitch line 58 is situated on the longitudinal centers of the end pieces 50 and 52. Thus, in the preferred embodiment, the span of the stitch line 58 is approximately 51 millimeters, and it is positioned approximately 94 millimeters from either end of the tether pieces 50 and 52.

The tether pieces 50, 52 and 54 are preferably made of the same material, and more preferably made of 840 denier nylon coated on one surface. In the orientation of the inflation-controlling member 40 shown in FIGS. 7 and 8, the uncoated surfaces of the tether pieces face each other. The material of the tether end pieces 50 and 52 has a 90° weave pattern 60. (See FIG. 7.) In other words, the fibers of the material are positioned at a 90° angle relative to either the longitudinal or lateral sides of the pieces 50 and 52. This 90° weave pattern (or "bias") prevents the end pieces 50 and 52 from stretching or elongating during the inflation process.

The material of the center piece 54 has a 45° weave pattern 62. In other words, the fibers of the material are positioned at a 45° angle relative to the ends and lateral edges of the piece 54. This 45° weave pattern (or "bias") allows the central piece 54 to stretch or elongate during the final stages of the inflation process. If the preferred material is used, the piece will elongate or stretch 50% to 70%. It should be noted that the elongation or stretching of the central piece 54 need not be reversible. Thus, in comparison to an elastic piece, the central piece 54 need not return to its pre-elongation state when the force causing the elongation is eliminated.

The stretchable section 44 of the inflation-controlling member 40 consists essentially of the central piece 54. During the initial stages of the inflation process, the initial forces are absorbed by the tether end pieces 50 and 52 and the releasable connection 42. It is only after the releasable connection 42 is released, and the tether end pieces 50 and 52 are separated to extend the inflation-controlling member 40 to the intermediate length $L_{intermediate}$, that the stretchable section 44 will be subjected to elongation forces. Thus, the stretchable section 44 is not affected by the initial and intermediate forces and is not elongated until the final stages of the inflation process.

One may now appreciate that the present invention provides an airbag inflation-controlling member that, when incorporated into an airbag, allows for a three-stage inflation process in which an out-of-position occupant will be protected and an in-position occupant's contact with the bag will be of a relatively gentle nature. Although the invention has been shown and described with respect to a certain preferred embodiment, it is obvious that equivalent alterations and modifications will occur to others skilled in the art upon the reading and understanding of this specification. The present invention includes all such equivalent alterations and modifications and is limited only by the scope of the following claims.

What is claimed is:

1. A vehicle airbag comprising an inflatable bag and an inflation-controlling member which is coupled to said bag;
   said bag including chamber-defining portions defining a chamber which is filled with inflation fluid to inflate said airbag during an inflation process, said bag being subjected to initial forces during initial stages of the inflation process, intermediate forced during intermediate stages of the inflation process, and final forces during final stages of the inflation process;
   said inflation-controlling member extending through said chamber during the inflation process and controlling the shape of said bag;
   said inflation-controlling member including a releasable connection and a stretchable section;
   said releasable connection including means for remaining intact during the initial stages of the inflation process so that said inflation-controlling member extends to an initial length and so that said bag assumes an initial shape during initial stages of the inflation process and for
   extending said inflation-controlling member from said initial length to an intermediate length greater than said initial length so that said bag assumes an intermediate shape during intermediate stages of the inflation process; and
   said stretchable section including means for stretching said inflation-controlling member from said intermediate length to a final length greater than said intermediate length so that said bag assumes a final shape.

2. An airbag as set forth in claim 1 wherein said initial shape of said bag is a double-humped shape and wherein said final shape of said bag is roughly cylindrical.

3. An airbag as set forth in claim 1 wherein said releasable connection is of a strength which:
   withstands said initial forces and thus remains intact during initial stages of the inflation process thereby allowing said inflation-controlling member to extend to said initial length, and
   is overcome by said intermediate forces and thus releases during intermediate stages of the inflation process thereby allowing said inflation-controlling member to extend to said intermediate length.

4. A vehicle airbag comprising an inflatable bag and an inflation-controlling member which is coupled to said bag;
   said bag including chamber-defining portions defining a chamber which is filled with inflation fluid to inflate said airbag during an inflation process, said bag being subjected to initial forces during initial stages of the inflation process, intermediate forces during intermediate stages of the inflation process, and final forces during final stages of the inflation process;
   said inflation-controlling member extending through said chamber during the inflation process and controlling the shape of said bag;
   said inflation-controlling member including a releasable connection and a stretchable section;
   said releasable connection remaining intact during the initial stages of the inflation process so that said inflation-controlling member extends to an initial length and said bag assumes an initial shape;
   said releasable connection releasing during intermediate stages of the inflation process so that said inflation-controlling member extends from said initial length to an intermediate length greater than said initial length and said bag assumes an intermediate shape; and
   said stretchable section stretching during final stages of the inflation process so that said inflation-controlling member extends from said intermediate length to a final length greater than said intermediate length and said bag assumes a final shape;
   said releasable connection being of a strength which withstands said initial forces and thus remains intact during initial stages of the inflation process thereby allowing said inflation-controlling member to extend to said initial length, and which is overcome by said intermediate forces and thus releases during intermediate stages of the inflation process thereby allowing said inflation-controlling member to extend to said intermediate length; and
   said stretchable section being unaffected by said initial and intermediate forces and having elongation properties causing it to be elongated by the final forces thereby allowing said inflation-controlling member to extend from said intermediate length to said final length during the final stages of the inflation process.

5. A vehicle airbag comprising an inflatable bag and an inflation-controlling member which is coupled to said bag;
   said bag including chamber-defining portions defining a chamber which is filled with inflation fluid to inflate said airbag during an inflation process, said bag being subjected to initial forces during initial stages of the inflation process, intermediate forces during intermediate stages of the inflation process, and final forces during final stages of the inflation process;

said inflation-controlling member extending through said chamber during the inflation process and controlling the shape of said bag;

said inflation-controlling member including a releasable connection and a stretchable section;

said releasable connection remaining intact during the initial stages of the inflation process so that said inflation-controlling member extends to an initial length and said bag assumes an initial shape;

said releasable connection releasing during intermediate stages of the inflation process of that said inflation-controlling member extends from said initial length to an intermediate length greater than said initial length and said bag assumes an intermediate shape;

said stretchable section stretching during final stages of the inflation process so that said inflation-controlling member extends from said intermediate length to a final length greater than said intermediate length and said bag assumes a final shape;

said inflation-controlling member being of a three-piece construction and comprising a first end piece, a second end piece, and a central piece joining said first end piece to said second end piece, said central piece including said stretchable section.

6. An airbag as set forth in claim 1 wherein:
said bag includes a mouth portion defining an inflation fluid inlet communicating with said chamber;
said chamber-defining portions of said bag include an occupant-contacting portion which is positioned to contact an in-position vehicle occupant when said bag assumes said final shape; and
said inflation-controlling member extends across said chamber from said mouth portion to said occupant-contacting portion.

7. An airbag as set forth in claim 6 wherein said occupant-contacting portion is located on a front region of said bag, approximately opposite said fluid inlet.

8. An airbag as set forth in claim 7 wherein said inflation-controlling member has a first end attached to said mouth portion and a second end attached to said occupant-contacting portion, said releasable connection and said stretchable section being located intermediate said first and second ends.

9. An airbag as set forth in claim 1 wherein said intermediate length is at least three times great as said initial length.

10. An airbag as set forth in claim 9 wherein said intermediate length is approximately five times as great as said initial length.

11. An airbag as set forth in claim 1 wherein said final length is at least ten percent longer than said intermediate length.

12. An airbag as set forth in claim 11 wherein said final length is twenty-five to thirty-six percent longer than said intermediate length.

13. An airbag as set forth in claim 1 wherein said intermediate length is at least three times great as said initial length and wherein said final length is at least ten percent longer than said intermediate length.

14. An airbag as set forth in claim 13 wherein said intermediate length is approximately five times as great as said initial length and wherein said final length is twenty-five to thirty-six percent longer than said intermediate length.

15. An airbag as set forth in claim 1 wherein said initial length is approximately 96 millimeters; said intermediate length is approximately 488 millimeters; and said final length is approximately 614–664 millimeters.

16. An airbag as set forth in claim 1 wherein said stretchable section has elongation properties causing it to elongate 50% to 70% when subjected to said final forces.

17. An airbag as set forth in claim 1 wherein said inflation-controlling member comprises a tether having a first end attached to said bag and a second end also attached to said bag, said releasable connection and said stretchable section being positioned on said tether intermediate said first and second ends.

18. An airbag as set forth in claim 17 wherein:
said bag includes a mouth portion defining an inflation fluid inlet communicating with said chamber;
said chamber-defining portions of said bag include an occupant-contacting portion which is positioned to contact an in-position vehicle occupant when said bag assumes said final shape; and
said first end of said tether is attached to said mouth portion of said bag and said second end of said tether is attached to said occupant-contacting portion.

19. A vehicle airbag comprising an inflatable bag and an inflation-controlling member which is coupled to said bag;
said bag including chamber-defining portions defining a chamber which is filled with inflation fluid to inflate said airbag during an inflation process, said bag being subjected to initial forces during initial stages of the inflation process, intermediate forces during intermediate stages of the inflation process, and final forces during final stages of the inflation process;
said inflation-controlling member extending through said chamber during the inflation process and controlling the shape of said bag;
said inflation-controlling member including a releasable connection and a stretchable section;
said releasable connection remaining intact during the initial stages of the inflation process so that said inflation-controlling member extends to an initial length and said bag assumes an initial shape;
said releasable connection releasing during intermediate stages of the inflation process so that said inflation-controlling member extends from said initial length to an intermediate length greater than said initial length and said bag assumes an intermediate shape;
said stretchable section stretching during final stages of the inflation process so that said inflation-controlling member extends from said intermediate length to a final length greater than said intermediate length and said bag assumes a final shape;
said inflation-controlling member comprising a tether having a first end attached to said bag and a second end also attached to said bag, said releasable connection and said stretchable section being positioned on said tether intermediate said first and second ends;
said bag including a mouth portion defining an inflation fluid inlet communicating with said chamber;
said chamber-defining portions of said bag including an occupant-contacting portion which is positioned to contact an in-position vehicle occupant when said bag assumes said final shape;

said first end of said tether being attached to said mouth portion of said bag and said second end of said tether being attached to said occupant-contacting portion;

said tether being of a three-piece construction and comprising a first end piece, a second end piece, and a central piece joining said first end piece to said second end piece; said first and second end pieces including said first and second ends of said tether, respectively.

20. An airbag as set forth in claim 19 wherein said releasable connection joins intermediate portions of said first and second end pieces together and wherein said central piece comprises said stretchable section of said inflation-controlling member.

21. An airbag as set forth in claim 20 wherein said releasable connection comprises break-away stitching.

22. An airbag as set forth in claim 20 wherein said central section is made of a material having a 45° weave pattern.

23. An airbag as set forth in claim 22 wherein said material is 840 denier nylon coated on one surface.

24. An airbag as set forth in claim 20 wherein said first and second end pieces are made of the same material as said central section and have a 90° weave pattern.

25. An airbag as set forth in claim 24 wherein said material is 840 denier nylon coated on one surface.

26. An airbag as set forth in claim 20 wherein said end pieces and said central piece are each rectangular in shape and each approximately 76 millimeters wide.

27. An airbag as set forth in claim 26 wherein said end pieces are each approximately 118 millimeters long and wherein said central piece is approximately 144 millimeters long.

28. An airbag as set forth in claim 21 wherein said break-away stitch pattern consist essentially of a stitch line having twenty stitches formed from 69 nylon thread and having an approximately 10 stitch/inch density.

29. An airbag as set forth in claim 28 wherein said stitch line has a span which is approximately ⅔ the width of one of said end pieces.

30. An airbag as set forth in claim 29 wherein said stitch line is centrally located on said end pieces.

31. An airbag as set forth in claim 30 wherein said stitch line has a span approximately equal to 51 millimeters and wherein said stitch line is located approximately 94 millimeters from either end of said end pieces.

32. An airbag inflation-controlling member for controlling the shape of an inflatable bag and absorbing forces imposed on the bag during an inflation process;

said inflation-controlling member comprising a three-piece tether and means for coupling said tether to the bag;

said tether including a first end piece, a second end piece, and a central piece joining said first end piece to said second end piece;

said tether also including a releasable connection and a stretchable section, said stretchable section being incorporated into said central piece;

said releasable connection, when intact, allowing the tether to extend to an initial length, and, when released, allowing the tether to extend from said initial length to an intermediate length greater than said initial length; and said stretchable section allowing the tether to extend from the intermediate length to a final length greater than said intermediate length.

33. An inflation-controlling member as set forth in claim 32 wherein said intermediate length is at least three times great as said initial length.

34. An inflation-controlling member as set forth in claim 33 wherein said intermediate length is approximately five times as great as said initial length.

35. An inflation-controlling member as set forth in claim 32 wherein said final length is at least ten percent longer than said intermediate length.

36. An inflation-controlling member as set forth in claim 35 wherein said final length is twenty-five to thirty-six percent longer than said intermediate length.

37. An inflation-controlling member as set forth in claim 32 wherein said intermediate length is at least three times great as said initial length and wherein said final length is at least ten percent longer than said intermediate length.

38. An inflation-controlling member as set forth in claim 37 wherein said intermediate length is approximately five times as great as said initial length and wherein said final length is twenty-five to thirty-six percent longer than said intermediate length.

39. An inflation-controlling member as set forth in claim 32 wherein said initial length is approximately 96 millimeters, said intermediate length is approximately 488 millimeters, and said final length is approximately 614–664 millimeters.

40. An inflation-controlling member as set forth in claim 32 wherein said releasable connection comprises break-away stitching.

41. An inflation-controlling member as set forth in claim 32 wherein said central section is made of a material having a 45° weave pattern.

42. An inflation-controlling member as set forth in claim 41 wherein said material is 840 denier nylon coated on one surface.

43. An inflation-controlling member as set forth in claim 32 wherein said first and second end pieces are made of the same material as said central section and have a 90° weave pattern.

44. An inflation-controlling member as set forth in claim 43 wherein said material is 840 denier nylon coated on one surface.

45. An inflation-controlling member as set forth in claim 32 wherein said stretchable section has elongation properties causing it to elongate 50% to 70% when subjected to said final forces.

46. An inflation-controlling member as set forth in claim 32 wherein said end pieces and said central piece are each rectangular in shape and each approximately 76 millimeters wide.

47. An inflation-controlling member as set forth in claim 46 wherein said end pieces are each approximately 118 millimeters long and wherein said central piece is approximately 144 millimeters long.

48. An inflation-controlling member as set forth in claim 40 wherein said break-away stitch pattern consists essentially of a stitch line having twenty stitches formed from 69 nylon thread and having an approximately 10 stitch/inch density.

49. An inflation-controlling member as set forth in claim 48 wherein said stitch line has a span which is approximately ⅔ the width of one of said end pieces.

50. An inflation-controlling member as set forth in claim 49 wherein said stitch line is centrally located on said end pieces.

51. An inflation-controlling member as set forth in claim 50 wherein said stitch line has a span approximately equal to 51 millimeters and wherein said stitch line is located approximately 94 millimeters from either end of said end pieces.

* * * * *

UNITED STATES PATENT AND TRADEMARK OFFICE
CERTIFICATE OF CORRECTION

PATENT NO. : 5,308,113
DATED : May 3, 1994
INVENTOR(S) : Michael A. Moriset

It is certified that error appears in the above-indentified patent and that said Letters Patent is hereby corrected as shown below:

In column 7, line 46, "forced" should be --forces--.

Signed and Sealed this

Sixteenth Day of August, 1994

Attest:

BRUCE LEHMAN

Attesting Officer    Commissioner of Patents and Trademarks